United States Patent [19]
Valley

[11] Patent Number: 5,018,237
[45] Date of Patent: May 28, 1991

[54] DIPSTICK WIPE-OFF TOOL

[76] Inventor: Charles R. Valley, 1309 Redbud Dr., Fairborn, Ohio 45324

[21] Appl. No.: 487,405

[22] Filed: Mar. 1, 1990

[51] Int. Cl.$^5$ ............................................. F01M 11/12
[52] U.S. Cl. .................................... 15/244.1; 15/210 B
[58] Field of Search .......................... 15/244.1, 210 B

[56] References Cited

U.S. PATENT DOCUMENTS

| | | | |
|---|---|---|---|
| 2,191,817 | 2/1940 | Shelor | 15/210 |
| 2,253,269 | 8/1941 | Gaddis | 15/210 |
| 2,659,922 | 11/1953 | Klein | 15/210 B |
| 3,205,525 | 9/1965 | Birtzer | 15/210 |
| 3,686,702 | 8/1972 | Jordan | 15/210 B |
| 4,164,054 | 8/1979 | Hanson et al. | 15/210 B |
| 4,245,367 | 1/1981 | Stoute | 15/210 B |
| 4,380,841 | 4/1983 | Thomas | 15/210 B |
| 4,558,520 | 12/1985 | Forde, Jr. | 33/126.7 R |
| 4,716,615 | 1/1988 | Whitehead et al. | 15/210 B |

FOREIGN PATENT DOCUMENTS

| | | | |
|---|---|---|---|
| 710077 | 6/1954 | United Kingdom . | |
| 2094618 | 9/1982 | United Kingdom | 15/210 B |

Primary Examiner—Chris K. Moore
Attorney, Agent, or Firm—John R. Flanagan

[57] ABSTRACT

A dipstick wipe-off tool includes a body composed of a flexible, resilient, absorbent material, an elongated open hole extending axially through the center of the body, and a pair of normally closed slits extending through the body along opposite sides of the hole. The closed slits are aligned with one another along a common line and extend in opposite directions from the hole such that when the body is squeezed along the line of the slits the size of the hole is enlarged as the slits open up.

16 Claims, 1 Drawing Sheet

DIPSTICK WIPE-OFF TOOL

BACKGROUND OF THE INVENTION

1. Field of the Invention

The present invention generally relates to fluid gauging dipstick wiping devices and, more particularly, is concerned with an improved dipstick wipe-off tool.

2. Description of the Prior Art

A common practice for checking the level of fluids, such as engine, transmission and brake fluids, in vehicles and machinery is to insert a dipstick into the fluid reservoir. The fluid clings to the length of the dipstick that extends below the surface of the fluid. A gauge on the dipstick indicates approximately how much the fluid is below full.

The conventional dipstick is an elongated narrow strip-like rod having a ring fixed on one end for grasping the dipstick, markings defining the gauge on the opposite end, and a cylindrical collar attached at an intermediate location along the rod which limits the extent to which the dipstick can enter the fluid reservoir. In checking the fluid level in the reservoir, the dipstick is first withdrawn from the reservoir. As it is typically covered with fluid, it is not yet possible to take a reading. Therefore, the dipstick is wiped off, using a cloth rag or paper towel, and then reinserted back into the reservoir and withdrawn a second time for taking the reading. The fluid level is then read by noting the extent to which the dipstick is coated with fluid relative to the gauge markings.

This procedure is relatively simple and easy to perform; however, oftentimes there is no cloth rag or paper towel available for use in wiping the fluid from the dipstick. Also, the cloth rag or paper towel may not be sufficiently absorbent to collect the fluid from the wiped dipstick, causing some of the fluid to drip onto and soil the hands and clothes of the user. Various alternative devices specifically designed for wiping the dipstick have been proposed in the prior art.

U.S. Pat. No. 3,205,525 to Birtzer discloses a wiping device having a normally closed diametrical slit in a cylindrical plug fitted in a container which is opened by pinching or squeezing the upper end of the container to insert the dipstick through the slit in the plug. The plug is a solid cylinder disc of resilient absorbent material, such as felt of the like. The slot normally stays closed so that the oil will not escape from the container. British Pat. No. 710,077 to Witmond discloses a wiping device similar to that of Birtzer except that metal discs are employed above and below the wiper plug so that the container and plug cannot be squeezed to open the slits to insert the dipstick. U.S. Pat. No. 4,245,367 to Stoute discloses a wiping device in the form of an absorbent foam pad having a number of slits, each capable of passing and wiping the dipstick. The pad is composed of a cylindrical body of foam rubber, plastic foam, felt or other suitably soft, deformable, absorptive material.

U.S. Pat. No. 4,164,054 to Hanson et al discloses a wiping device in the form of a block of absorbent porous foam plastic with an open slot. The foam plastic is flame retardant flexible polyurethane foam material. U.S. Pat. No. 2,253,269 to Gaddis discloses a wiping device in the form of a rectangular block having an open slot extending from an edge of the block to a cylindrical opening through the block giving the block an open bifurcated end portion to permit passing the dipstick through the device.

The constructions of the wiping devices of these prior art patents appear to represent a step in the right direction in providing a viable alternative wiping device to the cloth rag and paper towel. However none are seen to offer the optimum construction both for making it easy to insert the dipstick through the device and for still providing a tight enough fit about the dipstick to ensure adequate wiping of the fluid therefrom. Consequently, a need exists for further improvement to wiping devices of this general type.

SUMMARY OF THE INVENTION

The present invention provides a dipstick wipe-off tool designed to satisfy the aforementioned needs. The tool is in the form of a body composed of an absorbent material and has an elongated open hole extending axially through the center of the body and at least one and preferably a pair of normally closed slits extending along the hole. The slits are aligned with one another and extend along a common line in opposite directions from the hole such that when the body is squeezed along the line of the slits the size of the hole is enlarged as the slits open up.

In the prior art wiping device of the Birtzer patent, the normally closed slit of the absorbent plug makes it difficult to easily open the slit. In squeezing opposite ends of the closed slit, if the force is not accurately directed along the line of the slit, the slit might not open, but instead merely bow to one side or the other and stay closed. In contrast thereto, in the tool of the present invention the presence of the hole between the slits through the body, in effect, provides a partial, starting opening which will accurately guide and direct application of the squeezing force in a way that ensures expansion of the partial opening providing by the hole.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
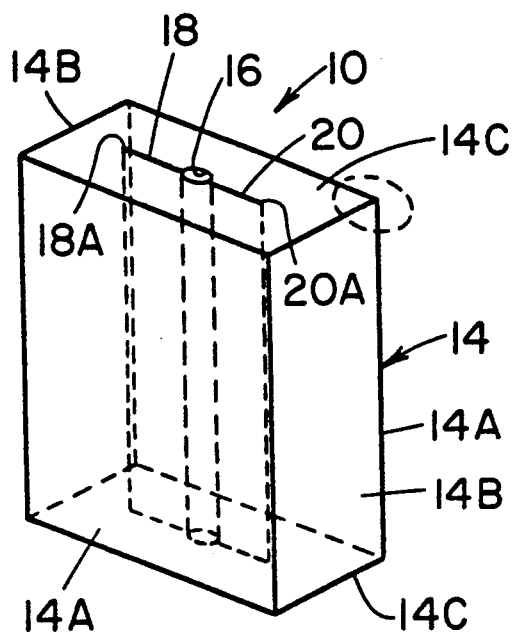
FIG. 1 is a perspective view of a dipstick wipe-off tool of the present invention.
Figure 2:
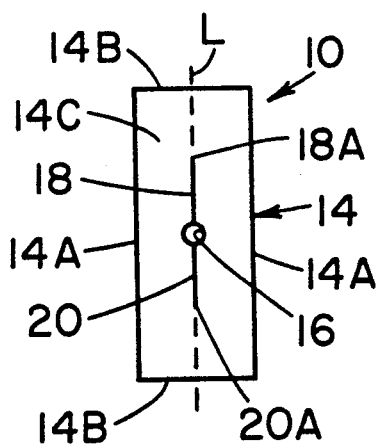
FIG. 2 is a top plan view of the tool of FIG. 1.
Figure 4:
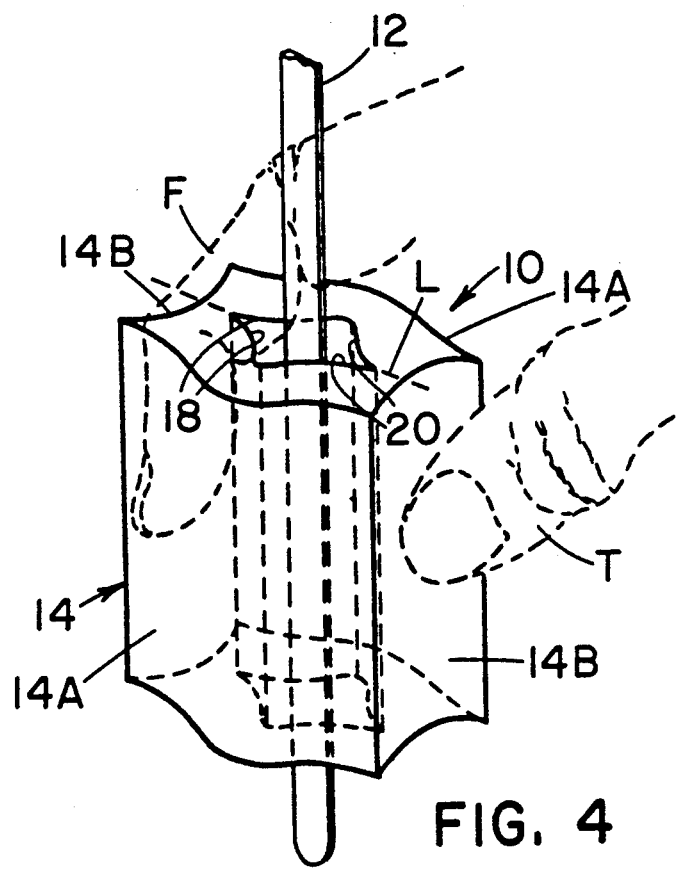
FIG. 4 is a perspective view of the tool squeezed to a fully opened condition with the fluid dipstick inserted therethrough.

Referring to the drawings, and particularly to FIGS. 1 and 2, there is shown a tool of the present invention, generally designated 10, for wiping fluids off a conventional dipstick 12 (FIG. 4). The wipe-off tool 10 has a body 14, preferably in the configuration of a rectangular block, although other shapes are possible within the purview of the present invention. The body 14 in the rectangular block configuration is bounded by a pair of first sides 14A, a pair of second sides 14B, and a pair of end sides 14C. The one dimension (or length) of each first side 14A is longer than the one dimension (or width) of each second side 14B which extends in respective directions along the sides within a transverse cross-sectional plane through the body 14 that intersects the first and second sides 14A, 14B and extends parallel to the end sides 14C.

Figure 3:
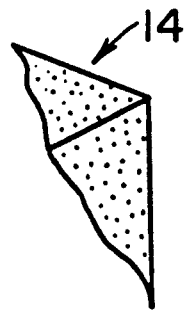
FIG. 3 is an enlarged perspective view of a corner of the tool encircled in FIG. 1.

The body 14 is composed of a flexible, springy, resilient material which will readily absorb and hold the fluids being wiped off the dipstick and which will return to its original shape after release from being squeezed. Where the fluids are hydrocarbons, such as engine, transmission and brake fluids, the material composing the body 14 is preferably a thermoplastic foam, for example, open cell polyester foam, as schematically depicted in FIG. 3.

Referring again to FIGS. 1 and 2, the wipe-off tool 10 of the present invention also has an elongated open hole 16 formed through the body 14. The hole 16 is preferably of cylindrical shape, although other shapes are possible within the purview of the present invention. The hole 16 preferably extends axially through the center of the body 14.

Referring still to FIGS. 1 and 2, the wipe-off tool 10 of the present invention further has at least one and preferably a pair of closed slits 18, 20 formed through the body 14 and extending along opposite sides of the hole 16. The slits 18, 20 are preferably generally planar in configuration and aligned with one another along a common line L. The slits 18, 20 extend in opposite directions from the open hole 16, ending respectively at locations 18A, 20A. The slits 18, 20 are also aligned substantially parallel with the first or long sides 14A of the body 14 and substantially perpendicular to the second or short sides 14B thereof. The slits 18, 20 terminate at respective points 18A, 20A located intermediate between the opposite sides of the hole 16 and the short sides 14B of the body 14.

Referring to FIG. 4, given such construction and configuration of the open hole 16 and normally closed slits 18, 20 such that the slits are narrower than the open hole, the wipe-off tool 10 exhibits improved performance in consistently opening up as desired when squeezed to receive insertion the dipstick 12 and in closing in snug fitting contact about the dipstick 12 as desired when released to adequately wipe off fluids as the dipstick is withdrawn from the tool 10. Particularly, when the body 14 of the tool 10 is squeezed from opposite directions between the user's index finger F and thumb T along the line L of the slits 18, 20, the size of the open hole 16 becomes enlarged, as seen in FIG. 4, as the slits 18, 20 open up to V-shapes. The presence of the open hole 16 provides a partial, starting opening which will accurately guide the application of squeezing force in a way that ensures that the squeezing force applied through the short sides 14B of the body 14 will consistently cause the slits 18, 20 to properly open and thus expand the partial opening through the body 14 provided by the hole 16.

The alignment of the slits 18, 20 generally parallel the long sides 14A and generally perpendicular to short sides 14B of the rectangular block-shaped body 14 also provides an easy visual guide for a user to remember and recognize how to grasp and squeeze the tool 10 relative to the orientation of the slits 18, 20 in order to properly use the tool. Otherwise, the user would have to first inspect inspect the tool 10 carefully to determine the direction of the slits 18, 20, which can be difficult to see.

In one practical example of the tool 10, the long side 14A of the body 14 is two and one-half inches in length and height, the short side 14B of the body 14 is one inch in width and two and one-half inches in height. Thus, the opposite end sides 14C of the body 14 are the same size as the short sides 14B. The foam block-shaped body 14 is center-drilled to provide the hole 14 with a one-quarter inch diameter. Each of the slits 18, 20 extend one-half inch from the opposite points on the perimeter of the one-quarter inch diameter hole 16.

It is thought that the present invention will be understood from the foregoing description and it will be apparent that various changes may be made thereto without departing from its spirit and scope or sacrificing all of its material advantages, the form hereinbefore described being merely preferred or exemplary embodiment thereof.

Having thus described the invention, what is claimed is:

1. A dipstick wipe-off tool, comprising:
    (a) a body composed of an absorbent material;
    (b) said body having an elongated open hole formed by and within said material of said body providing a starting opening extending axially through said body; and
    (c) said body also having at least one slit formed by and within said material of said body, said slit having a normally closed orientation and being narrower than said open hole, said slit extending through said material of said body along one side of said hole and connected with said starting opening provided by said hole such that when said body is squeezed from opposite directions along the line of said slit the starting opening will accurately guide the application of the squeezing force in a way that the slot opens up and the size of said starting opening through said body becomes enlarged as said slit opens up.

2. The tool as recited in claim 1, wherein said body is composed of a flexible, springy, resilient material which will absorb and hold fluid being wiped off a dipstick and which will return to its original shape after release from being squeezed.

3. The tool as recited in claim 1, wherein said body has a generally rectangular block configuration bounded by a pair of first sides, a pair of second sides, and an pair of end sides, said first sides being longer than said second sides in directions within a transverse cross-sectional plane through said body.

4. The tool as recited in claim 3, wherein said slit terminates at a point located intermediate between one of said opposite sides of said hole and one of said second sides of said body.

5. The tool as recited in claim 3, wherein said slit is aligned generally parallel to said first sides of said body and perpendicular to second sides of said body so as to provide a visual guide for a user as to how to grasp and squeeze said body relative to said slit in order to properly use said tool.

6. The tool as recited in claim 1, wherein said hole is formed and extends axially through the center of said body.

7. The tool as recited in claim 1, wherein said hole is of cylindrical shape.

8. The tool as recited in claim 1, wherein said slit is generally planar in configuration.

9. A dipstick wipe-off tool, comprising:
    (a) a body composed of an absorbent material;

(b) said body having an elongated open hole formed by and within said material of said body providing a starting opening extending axially through the center of said body; and (c) said body also having a pair of slits formed by and within said material of said body, said slits having normally closed orientations and being narrower than said open hole, said slits being generally planar in configuration and aligned with one another along a common line, extending in opposite directions from opposite sides of said hole through said material of said body along said opposite sides of said hole, and connected with said starting opening through said body provided by said hole such that when said body is squeezed from opposite directions along the common line of said slits the starting opening will accurately guide the application of the squeezing force in a way that the slits open up and the size of said starting opening through said body becomes enlarged as said slits open up 10. The tool as recited in claim 9, wherein said body is composed of a flexible, springy, resilient material which will absorb and hold fluid being wiped off a dipstick and which will return to its original shape after release from being squeezed.

11. The tool as recited in claim 9, wherein said body has a generally rectangular block configuration bounded by a pair of first sides, a pair of second sides, and an pair of end sides, said first sides being longer than said second sides in directions within a transverse cross-sectional plane through said body.

12. The tool as recited in claim 11, wherein said slits terminate at points located intermediate between said opposite sides of said hole and said second sides of said body.

13. The tool as recited in claim 11, wherein said slits are aligned generally parallel to said first sides of said body and perpendicular to second sides of said body so as to provide a visual guide for a user as to how to grasp and squeeze said body relative to said slit in order to properly use said tool.

14. The tool as recited in claim 9, wherein said hole is of cylindrical shape.

15. A dipstick wipe-off tool, comprising:

(a) a body composed of an absorbent material;

(b) means defining an elongated open hole in said body extending axially through said body; and (c) means defining at least one slit in said body having a normally closed orientation, said slit extending through said body along one side of said hole such that when said body is squeezed from opposite directions along the line of said slit the size of said open hole becomes enlarged as said slit opens up;

(d) said body having a generally rectangular block configuration bounded by a pair of first sides, a pair of second sides, and an pair of end sides, said first sides being longer than said second sides in directions within a transverse cross-sectional plane through said body;

(e) said slit in said body being aligned generally parallel to said first sides of said body and perpendicular to second sides of said body so as to provide a visual guide for a user as to how to grasp and squeeze said body relative to said slit in order to properly use said tool.

16. The tool as recited in claim 15, wherein said slit terminates at a point located intermediate between one of said opposite sides of said hole and one of said second sides of said body.

* * * * *